United States Patent
Taira et al.

(10) Patent No.: US 8,799,790 B2
(45) Date of Patent: Aug. 5, 2014

(54) COMPUTER-READABLE RECORDING MEDIUM STORING DRIVER PROGRAM, IMAGE FORMING SYSTEM, IMAGE FORMING APPARATUS, METHOD FOR CONTROLLING IMAGE FORMING APPARATUS, AND DRIVER PROGRAM

(75) Inventors: Yoshiyuki Taira, Osaka (JP); Shinichiro Watase, Osaka (JP); Syunta Isami, Osaka (JP); Masafumi Sato, Osaka (JP); Haruhisa Sumimoto, Osaka (JP); Yuichi Komori, Osaka (JP)

(73) Assignee: KYOCERA Document Solutions Inc. (JP)

( * ) Notice: Subject to any disclaimer, the term of this patent is extended or adjusted under 35 U.S.C. 154(b) by 1006 days.

(21) Appl. No.: 12/685,420

(22) Filed: Jan. 11, 2010

(65) Prior Publication Data

US 2010/0211914 A1 Aug. 19, 2010

(30) Foreign Application Priority Data

Feb. 18, 2009 (JP) .............................. 2009-035934
Feb. 18, 2009 (JP) .............................. 2009-035935

(51) Int. Cl.
*G06F 3/00* (2006.01)
*G06F 3/048* (2013.01)
*G06F 9/44* (2006.01)
*G06F 3/0482* (2013.01)
*G06F 3/0481* (2013.01)

(52) U.S. Cl.
CPC ............ *G06F 3/0482* (2013.01); *G06F 9/4443* (2013.01); *G06F 3/04817* (2013.01)
USPC ........... 715/760; 715/700; 715/810; 715/825; 715/845; 715/866

(58) Field of Classification Search
None
See application file for complete search history.

(56) References Cited

U.S. PATENT DOCUMENTS 5,434,565 A * 7/1995 Simon et al. .................. 340/949
5,706,454 A * 1/1998 MacPhail ...................... 715/822
(Continued)

FOREIGN PATENT DOCUMENTS

| CN | 1967541 | | 5/2007 |
| EP | 0540925 | * | 5/1993 |

(Continued)

OTHER PUBLICATIONS

J. David Eisenberg, An Introduction to Scalable Vector Graphics, Mar. 21, 2001, 12 pages.*

(Continued)

*Primary Examiner* — Ryan Pitaro
*Assistant Examiner* — Yongjia Pan
(74) *Attorney, Agent, or Firm* — McDonnell Boehnen Hulbert & Berghoff LLP (57) ABSTRACT

By a computer executing a driver program, an icon display processing unit, an operation detection unit, a setting change processing unit, and a customization unit are implemented. The icon display processing unit displays on a display device an icon associated with a setting item in an icon list. When a click operation is detected by the operation detection unit, the setting change processing unit changes a value of the setting item associated with the clicked icon to another value. Then, the icon display processing unit switches an icon image corresponding to a change of the value of the setting item. The customization unit customizes the icon list by performing at least one of adding or deleting the setting item to/from the icon list.

15 Claims, 11 Drawing Sheets

(56) References Cited

U.S. PATENT DOCUMENTS

| | | | |
|---|---|---|---|
| 6,863,455 B2 * | 3/2005 | Blom et al. | 400/61 |
| 8,237,940 B2 * | 8/2012 | Conescu et al. | 358/1.13 |
| 8,305,594 B2 * | 11/2012 | Tomita | 358/1.13 |
| 2007/0035564 A1 | 2/2007 | Katsuyama | |
| 2007/0067737 A1 * | 3/2007 | Zielinski et al. | 715/810 |
| 2007/0109580 A1 | 5/2007 | Yoshida | |
| 2009/0119578 A1 * | 5/2009 | Relyea et al. | 715/234 |
| 2010/0060909 A1 * | 3/2010 | Conescu et al. | 358/1.9 |
| 2011/0116131 A1 * | 5/2011 | Mitsui | 358/1.15 |
| 2012/0287069 A1 * | 11/2012 | Kim | 345/173 |

FOREIGN PATENT DOCUMENTS

| | | |
|---|---|---|
| EP | 1557749 B1 * | 7/2005 |
| JP | 08-044524 | 2/1996 |
| JP | 2007-041727 | 2/2007 |
| JP | 2007122521 | 5/2007 |
| JP | 2008-065630 | 3/2008 |

OTHER PUBLICATIONS

UPnP Printer:1 Device Template Version 1.01, Oct. 15, 2008, 7 pages.*

Making Settings in the Print Dialog Box, Jun. 21, 2008, 7 pages.*

Sara Ford, Did you know . . . You can create toolbar buttons to quickly toggle your favorite VS Settings?, Dec. 5, 2008, 2 pages.*

* cited by examiner

```xml
<? xml version="1.0" encoding="utf-8" ?>
<Window xmlns="http://xxxx">
  <Static name="ORIENTATION">
    <Dimension>
      <X type="integer">10</X>
      <Y type="integer">20</Y>
      <width type="integer">40</width>
      <height type="integer">50</height>
    </Dimension>
    <ShowUI type="string">True</ShowUI>
    <Procedure>wndProcOrientation</Procedure>
  </Static>
  <Static name="OUTPUTORDER">
    <Dimension>
      <X type="integer">55</X>
      <Y type="integer">20</Y>
      <width type="integer">40</width>
      <height type="integer">50</height>
    </Dimension>
    <ShowUI type="string">True</ShowUI>
    <Procedure>wndProcOutputOrder</Procedure>
  </Static>
  <Static name="COLOR">
    <Dimension>
      <X type="integer">145</X>
      <Y type="integer">20</Y>
      <width type="integer">40</width>
      <height type="integer">50</height>
    </Dimension>
    <ShowUI type="string">True</ShowUI>
    <Procedure>wndProcColor</Procedure>
  </Static>
</Window>
```

(B)

```xml
<? xml version="1.0" encoding="utf-8" ?>
<Window xmlns="http://xxxx">
  <Static name="PAGEAGGREGATION">
    <Dimension>
      <X type="integer">100</X>
      <Y type="integer">20</Y>
      <width type="integer">40</width>
      <height type="integer">50</height>
    </Dimension>
    <ShowUI type="string">True</ShowUI>
    <Procedure>wndProcPageAggregation</Procedure>
  </Static>
</Window>
```

```xml
<? xml version="1.0" encoding="utf-8" ?>
<Window xmlns="http://xxxx">
  <Static name="ORIENTATION">
    <Dimension>
      <X type="integer">10</X>
      <Y type="integer">20</Y>
      <width type="integer">40</width>
      <height type="integer">50</height>
    </Dimension>
    <ShowUI type="string">True</ShowUI>
    <Procedure>wndProcOrientation</Procedure>
  </Static>
  <Static name="OUTPUTORDER">
    <Dimension>
      <X type="integer">55</X>
      <Y type="integer">20</Y>
      <width type="integer">40</width>
      <height type="integer">50</height>
    </Dimension>
    <ShowUI type="string">True</ShowUI>
    <Procedure>wndProcOutputOrder</Procedure>
  </Static>
  <Static name="PAGEAGGREGATION">
    <Dimension>
      <X type="integer">100</X>
      <Y type="integer">20</Y>
      <width type="integer">40</width>
      <height type="integer">50</height>
    </Dimension>
    <ShowUI type="string">False</ShowUI>
    <Procedure>wndProcPageAggregation</Procedure>
  </Static>
  <Static name="COLOR">
    <Dimension>
      <X type="integer">100</X>
      <Y type="integer">20</Y>
      <width type="integer">40</width>
      <height type="integer">50</height>
    </Dimension>
    <ShowUI type="string">True</ShowUI>
    <Procedure>wndProcColor</Procedure>
  </Static>
</Window>
```

COMPUTER-READABLE RECORDING MEDIUM STORING DRIVER PROGRAM, IMAGE FORMING SYSTEM, IMAGE FORMING APPARATUS, METHOD FOR CONTROLLING IMAGE FORMING APPARATUS, AND DRIVER PROGRAM

INCORPORATION BY REFERENCE

This application is based upon and claims the benefit of priority from the corresponding Japanese Patent Application No. 2009-035934 and 2009-035935, both filed Feb. 18, 2009, the entire contents of which is incorporated herein by reference.

BACKGROUND

1. Field of the Invention

The present invention relates to a computer-readable recording medium storing a driver program, an image forming system, an image forming apparatus, a method for controlling image forming apparatus, and a driver program.

2. Description of the Related Art

An icon menu is generally formed of an information icon and a limited-state indicator icon. The limited-state indicator icon indicates whether or not an operation indicated by the information icon is being limited.

With the above-mentioned icon menu, a user can identify whether or not the operation indicated by the information icon is being limited. However, the user cannot confirm a setting content associated with the information icon immediately when glancing at the information icon.

Further, when the user clicks the icon in order to input the setting content associated with the icon, a screen including input fields appears. The user inputs the setting content on the screen. Accordingly, even with the icon menu, to change the setting content, the user needs to perform various operations as described above.

SUMMARY

The present invention relates to a computer-readable recording medium storing a driver program, an image forming system, an image forming apparatus, a method for controlling image forming apparatus, and a driver program. The driver program enables the user to immediately confirm a value of a setting item associated with an icon. Further, the driver program enables the user to change the value of the setting item by a simple operation. The image forming system comprises a terminal apparatus and the image forming apparatus that are connected via a communication path. The terminal apparatus is configured to generate image output data and transmit the image output data to the image forming apparatus. The terminal apparatus includes the driver program. A computer of the terminal apparatus is configured to execute the driver program and implement various processing units in the terminal apparatus. The computer is also configured to control the image forming apparatus based on the value of a setting item pertaining to a printing function.

The driver program stored in a computer-readable recording medium according to an embodiment of the present invention causes the computer to function as: (a) an icon display processing unit configured to display on a display device an icon associated with the setting item registered in a list; (b) an operation detection unit configured to detect an operation performed on the icon displayed on the display device; (c) a setting change processing unit configured to change, when the operation is detected by the operation detection unit, the value of the setting item associated with the icon upon which the operation has been performed; (d) an icon image switch processing unit configured to switch an icon image of the icon displayed on the display device, corresponding to a change of the value of the setting item made by the setting change processing unit; and (e) a customization unit configured to customize the list by performing at least one of adding or deleting the setting item to and from the list.

Additional features and advantages are described herein, and will be apparent from the following Detailed Description and the figures.

BRIEF DESCRIPTION OF THE FIGURES

In the accompanying drawings:

FIG. 2A is a diagram illustrating an example of an icon list illustrated in FIG. 1;

FIG. 2B is a diagram illustrating an example of another icon list illustrated in FIG. 1;

FIG. 11 is a diagram illustrating an example of one list that combines the two icon lists.

DETAILED DESCRIPTION

First Embodiment

Figure 1:
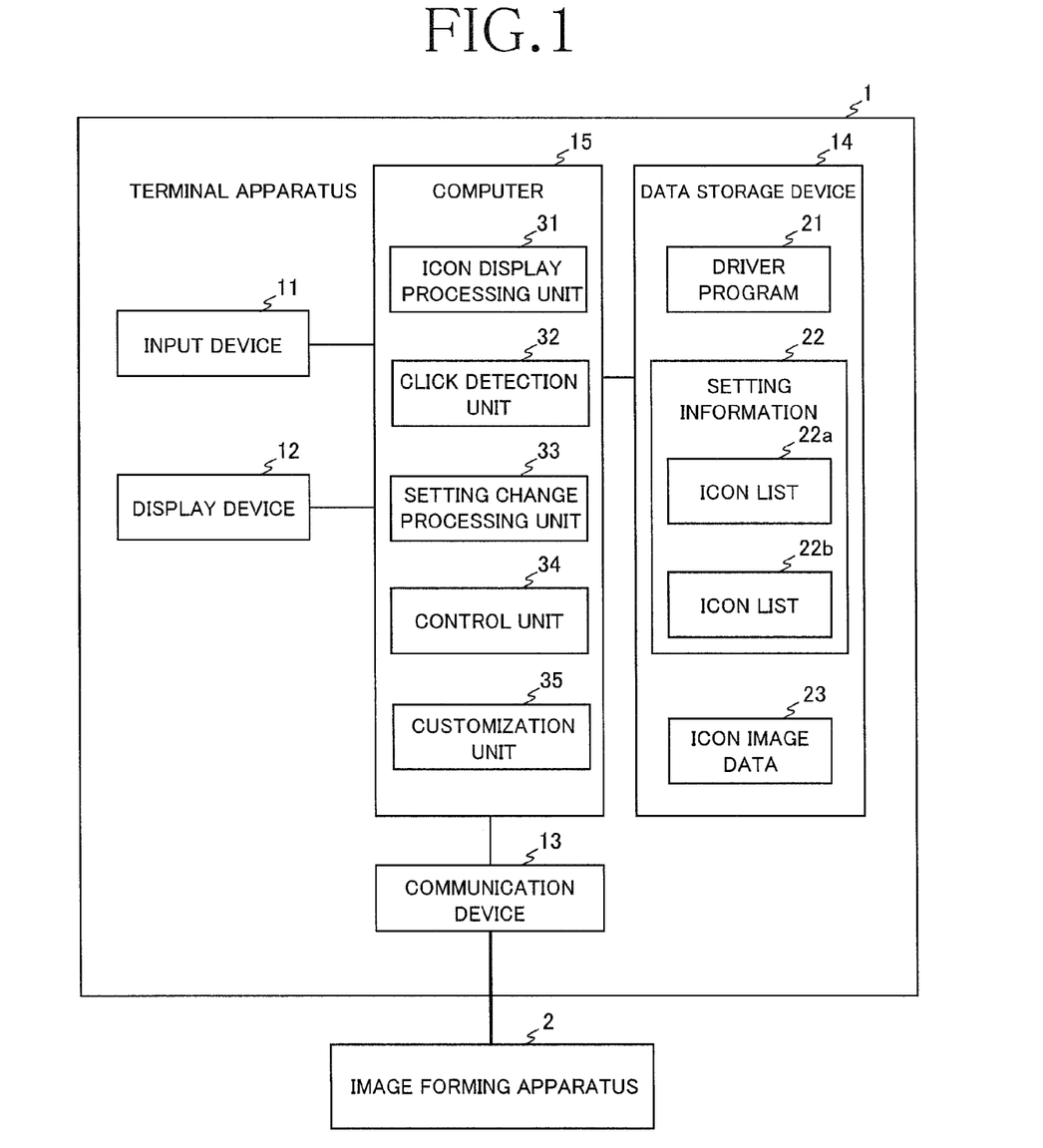
FIG. 1 is a block diagram illustrating an example of a configuration of a terminal apparatus including a computer that executes a driver program stored in a recording medium according to a first embodiment of the present invention.

FIG. 1 is a block diagram illustrating a configuration of a terminal apparatus including a computer 15 that executes a driver program stored in a recording medium according to a first embodiment of the present invention. A terminal apparatus 1 is, for example, a personal computer. An image forming apparatus 2 is connected to the terminal apparatus 1 via a communication path (such as a peripheral equipment interface cable or a computer network). The image forming apparatus 2 is an apparatus including a printing function, an image reading function, and/or a facsimile transmission/reception function.

The terminal apparatus 1 includes an input device 11, a display device 12, a communication device 13, a data storage device 14, and the computer 15.

The input device 11 is configured to detect a user's operation and output an electric signal corresponding to the operation. The input device 11 includes a keyboard, a mouse, and/or a touch panel.

The display device 12 is configured to receive an input of an electric signal and display an image corresponding to the electric signal on a screen. The display device 12 includes a liquid crystal display.

The communication device 13 is configured to perform data communications with peripheral equipment such as the image forming apparatus 2 via a predetermined communication path. The communication device 13 includes a peripheral equipment interface and a network interface card (NIC).

The data storage device 14 is configured to store data and a program. The data storage device 14 stores a driver program 21, setting information 22 including values of setting items, and icon image data 23. The data storage device 14 includes a hard disk driver and a nonvolatile memory. The icon image data 23 includes image data on icon images. The icon image includes text and/or an illustration.

The setting information 22 includes lists of the setting items associated with icons to be displayed in an icon menu. The lists include an icon list 22a including the setting items specified by default and an icon list 22b including the setting items specified by customization.

The driver program 21 is stored in a recording medium. The recording medium includes a read only memory (ROM), a universal serial bus (USB) memory, a flexible disk, a memory card, and a magneto-optical disk, which are read by the computer 15. When the driver program 21 is read from the recording medium onto the computer 15, an instruction is transferred to each of component parts that constitute the computer 15, and each of the component parts performs a process.

The icon lists 22a and 22b are text data described in a markup language. In the first embodiment, the icon lists 22a and 22b are described in Extensible Markup Language (XML).

FIG. 2A is a diagram illustrating an example of the icon list 22a illustrated in FIG. 1. FIG. 2B is a diagram illustrating an example of the icon list 22b illustrated in FIG. 1.

A Window element is an element indicating that the description relates to the icon menu, and specifies a name space used within this element. A Static element specifies a display position and a display size of an icon per setting item, and specifies a call-back function to be called when the icon is clicked.

A name attribute of the Static element is used to specify the setting item. In FIGS. 2A and 2B, the attribute "name="ORIENTATION"" is used to specify the setting item "paper orientation". The attribute "name="OUTPUTORDER"" is used to specify the setting item "copy unit printing". The attribute "name="PAGEAGGREGATION"" is used to specify the setting item "multiple pages grouping per paper". The attribute "name="COLOR"" is used to specify the setting item "color mode".

The Static element includes as child elements a Dimension element, a ShowUI element, and a Procedure element. The Dimension element includes an X element and a Y element that specify XY coordinates of a top-left corner of an icon image, and a width element and a height element that specify a width and a height (i.e., size) of the icon image, respectively. The ShowUI element specifies whether or not to permit displaying of the icon associated with the setting item specified by the Static element including the same ShowUI element. If the value of the ShowUI element is "True", the icon is displayed, and if the value of the ShowUI element is "False", the icon is not displayed. The Procedure element specifies the call-back function to be called when the icon is clicked. The value of the Procedure element includes a name of the call-back function.

Three setting items are registered in the icon list 22a illustrated in FIG. 2A, and the displaying of three icons associated with the three setting items is permitted. One setting item is registered in the icon list 22b illustrated in FIG. 2B, and an icon associated with the one setting item is displayed.

The computer 15 includes a central processing unit (CPU), a random access memory (RAM), and a read only memory (ROM), which are not illustrated. The computer 15 is configured to implement various processing units by loading a program on the RAM and causing the CPU to execute the program. When the driver program 21 is executed on the computer 15, an icon display processing unit 31, a click detection unit 32, a setting change processing unit 33, a control unit 34, and a customization unit 35 are implemented. The driver program 21 is an example of the computer program.

The icon display processing unit 31 is configured to display an icon on the display device 12. The icon display processing unit 31 is further configured to switch the icon image, corresponding to a change of the value of the setting item performed by the setting change processing unit 33. The icon display processing unit 31 switches from an icon image corresponding to the value of the setting item before the change to an icon image corresponding to the value of the setting item after the change.

The click detection unit 32 is configured to detect a click operation performed on the icon displayed on the display device 12.

The setting change processing unit 33 is configured to change, when the click operation is detected by the click detection unit 32, the value of the setting item associated with the clicked icon to another value.

The control unit 34 is configured to control the image forming apparatus 2 based on the value of the setting item.

The customization unit 35 is configured to customize the icon list by performing addition/deletion of the setting item to/from the list of the setting information 22.

Figure 3:
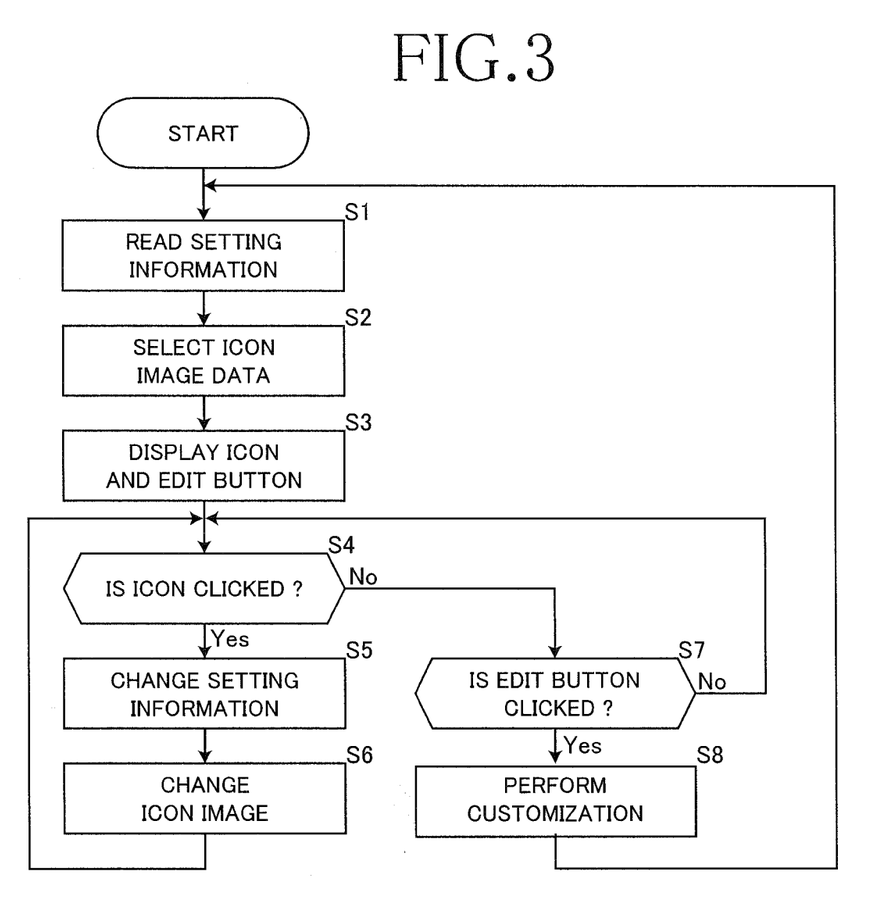
FIG. 3 is a flowchart for describing an operation of the terminal apparatus including the computer that executes the driver program stored in the recording medium according to the first embodiment of the present invention.

FIG. 3 is a flowchart for describing an operation of the terminal apparatus 1 on which the driver program is installed according to the first embodiment.

When an initial screen of the icon menu is displayed, the icon display processing unit 31 reads the icon lists 22a and 22b of the setting information 22 to identify the setting items registered in the icon lists 22a and 22b. In this embodiment, the icon display processing unit 31 interprets XML data described in the icon lists 22a and 22b to identify the setting items. The icon display processing unit 31 identifies the icons associated with the setting items to be included in the icon menu. Then, the icon display processing unit 31 reads the setting information 22 from the data storage device 14 to identify the current values of the setting items (Step S1). In this embodiment, the name attribute of the Static element is used to identify the setting items.

The icon display processing unit 31 reads the icon image data 23 on the icon image corresponding to the current value of each of the setting items from the data storage device 14 (Step S2). The icon display processing unit 31 displays on the display device 12 an edit button and icon images for each icon corresponding to the current value of each of the setting items (Step S3). Therefore, the icon menu is displayed. The edit button is configured to change the icons included in the icon menu. The icons including the icon images corresponding to the current values of the setting item are displayed, which enables the user to immediately visually recognize the current values of the setting items.

Figure 4:
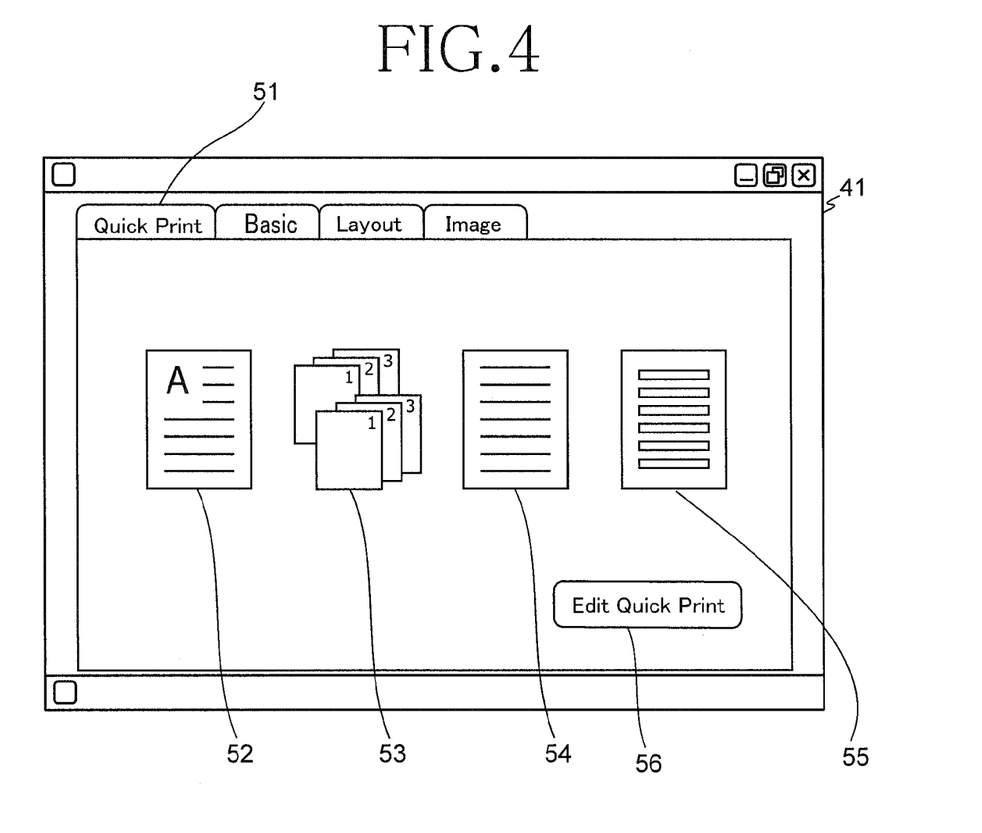
FIG. 4 is a diagram illustrating an example of an icon menu that is displayed on the terminal apparatus of FIG. 1.

FIG. 4 is a diagram illustrating an example of the icons that are displayed on the terminal apparatus 1 of FIG. 1. When the icon lists 22a and 22b are text data as illustrated in FIGS. 2A and 2B, the icon menu illustrated in FIG. 4 is displayed. The icon menu illustrated in FIG. 4 is displayed on one tab screen 51 within a window 41. The icon menu includes four icons 52 to 55. The icon 52 is an icon for a paper orientation setting, the icon 53 is an icon for a copy unit printing setting, the icon 54 is an icon for a multiple pages grouping per paper setting, and the icon 55 is an icon for a color mode setting. An edit button 56 is configured to display an edit screen for changing the icon included in the icon menu.

The value of the paper orientation setting includes "portrait" and "landscape". The icon image data 23 on the icon images corresponding to "portrait" and "landscape" is stored in the data storage device 14. One of those icon images is selected corresponding to the current value of the paper orientation setting to be used as the icon 52. In the icon menu illustrated in FIG. 4, the icon image corresponding to "portrait" is used as the icon 52.

The value of the copy unit printing setting includes "sort" and "collate". The icon image data 23 on the icon images corresponding to "sort" and "collate" is stored in the data storage device 14. One of those icon images is selected corresponding to the current value of the copy unit printing setting to be used as the icon 53. In the icon menu illustrated in FIG. 4, the icon image corresponding to "sort" is used as the icon 53.

The value of the multiple pages grouping per paper setting includes "1-UP" (i.e., no grouping per paper), "2-UP", and "4-UP". The icon image data 23 on the icon images corresponding to "1-UP", "2-UP", and "4-UP" is stored in the data storage device 14. One of those icon images is selected corresponding to the current value of the multiple pages grouping per paper setting to be used as the icon 54. In the icon menu illustrated in FIG. 4, the icon image corresponding to "1-UP" is used as the icon 54.

The value of the color mode setting includes "color" and "monochrome". The icon image data 23 on the icon images corresponding to "color" and "monochrome" is stored in the data storage device 14. One of those icon images is selected corresponding to the current value of the color mode setting to be used as the icon 55. In the icon menu illustrated in FIG. 4, the icon image corresponding to "color" is used as the icon 55. It should be noted that the icon 55 in the icon menu illustrated in FIG. 4 is drawn in black and white, but is actually set as an icon image using a plurality of colors. This enables the user to immediately visually recognize that the value "color" is set in the color mode setting.

When the user uses the input device 11 to perform a click operation on any one of the icons 52 to 55, the click detection unit 32 detects the operation based on a signal received from the input device 11 (Step S4).

When the click operation is detected by the click detection unit 32, the setting change processing unit 33 changes the value of the setting item associated with the clicked icon to another value (Step S5). In this embodiment, the setting change processing unit 33 changes the value of the setting item by the call-back function that is specified by the Procedure element within the Static element corresponding to the clicked icon. For example, if the icon 52 illustrated in FIG. 4 is clicked, the value of the paper orientation setting associated with the icon 52 is changed from "portrait" to "landscape". Therefore, the user can select the value by the click operation without performing an operation of selecting a desired value.

Further, when the click operation is detected by the click detection unit 32, corresponding to a change of the value of the setting item changed by the call-back function associated with the clicked icon, the icon display processing unit 31 switches the icon image from the icon image corresponding to the value of the setting item before the change to the icon image corresponding to the value of the setting item after the change (Step S6). For example, if the icon 52 illustrated in FIG. 4 is clicked, the value of the paper orientation setting associated with the icon 52 is changed from "portrait" to "landscape", and hence the icon image of the icon 52 is changed from the icon image of "portrait" to the icon image of "landscape".

If the click operation on the icon is detected, the value of the setting item is changed, and the icon image is also changed.

In this embodiment, an order of the values of the setting item is previously set, so that the value is changed in accordance with that order upon detection of the click operation. Further, each time a predetermined operation on the icon is detected, the value of the setting item is changed by a predetermined order, and after the last value in the predetermined order is reached, the value is returned to the first value in the predetermined order.

Figure 5:
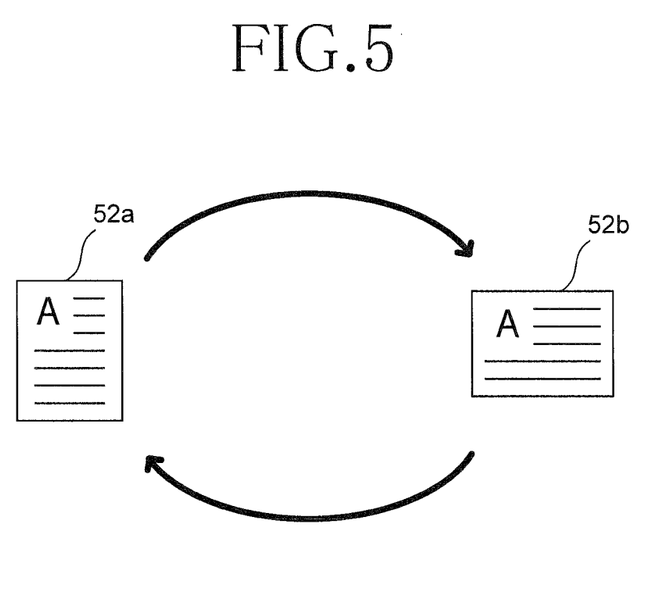
FIG. 5 is a diagram illustrating an example of icon images used as an icon for a paper orientation setting illustrated in FIG. 4 and a display order.

FIG. 5 is a diagram illustrating an example of the icon images used as the icon 52 for the paper orientation setting illustrated in FIG. 4 and a display order. When the order of "portrait" and "landscape" is set for the value of the paper orientation setting, the value is changed in the order of "portrait", "landscape", "portrait", "landscape", . . . . Therefore, as illustrated in FIG. 5, the icon images of the icon 52 are switched in the order of an icon image 52a of "portrait", an icon image 52b of "landscape", the icon image 52a of "portrait", the icon image 52b of "landscape", . . . .

Figure 6:
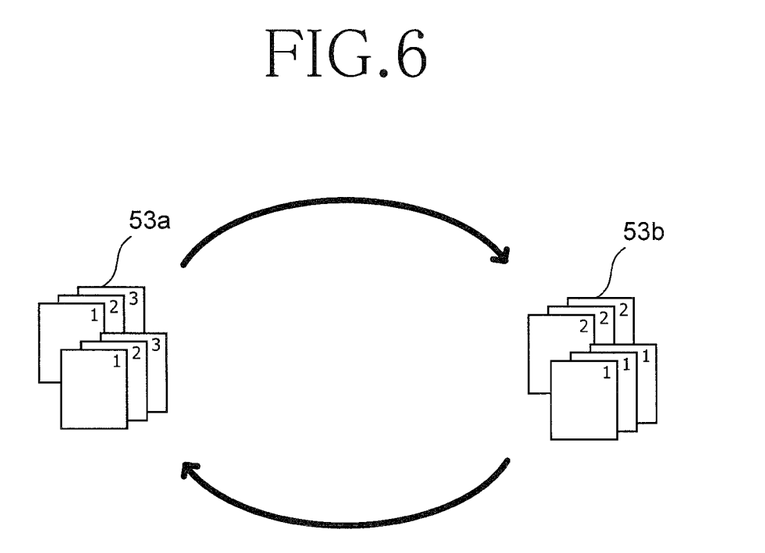
FIG. 6 is a diagram illustrating an example of icon images used as an icon for a copy unit printing setting illustrated in FIG. 4 and a display order.

FIG. 6 is a diagram illustrating an example of the icon images used as the icon 53 for the copy unit printing setting illustrated in FIG. 4 and a display order. The value of the copy unit printing setting and the icon image are changed in the same manner as those of the paper orientation setting.

Figure 7:
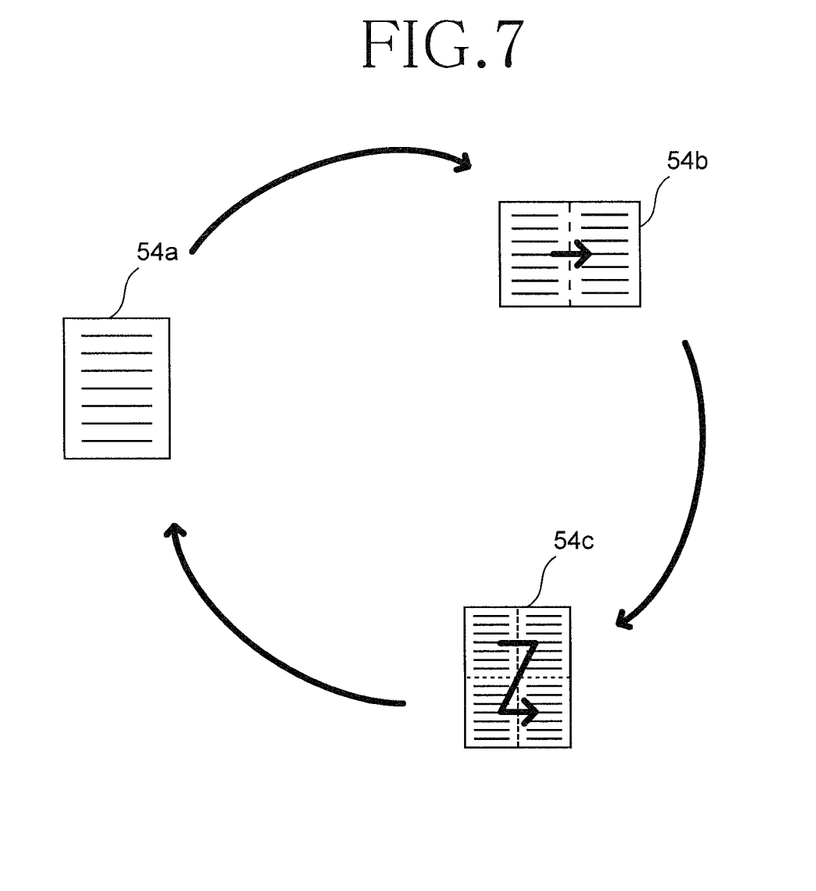
FIG. 7 is a diagram illustrating an example of icon images used as an icon for a multiple pages grouping per paper setting illustrated in FIG. 4 and a display order.

FIG. 7 is a diagram illustrating an example of the icon images used as the icon 54 for the multiple pages grouping per paper setting illustrated in FIG. 4 and a display order. When the order of "1-UP", "2-UP", and "4-UP" is set for the value of the multiple pages grouping per paper setting, the value is changed in the order of "1-UP", "2-UP", "4-UP", "1-UP", "2-UP", "4-UP", . . . . Therefore, as illustrated in FIG. 7, the icon images of the icon 54 are switched in the order of an icon image 54a of "1-UP", an icon image 54b of "2-UP", an icon image 54c of "4-UP", the icon image 54a of "1-UP", the icon image 54b of "2-UP", the icon image 54c of "4-UP", . . . .

If a printing request is generated in a state in which the values of the setting items are set as described above, the control unit 34 generates print data based on the values of the setting items at that time. And, the control unit 34 transmits the print data to the image forming apparatus 2 via the communication device 13. Therefore, on the image forming apparatus 2, a printing process is performed that reflects the values of the setting items regarding the printing function.

Meanwhile, when the user uses the input device 11 to perform a click operation on the edit button 56 in the icon menu, the click detection unit 32 detects the operation based on the signal received from the input device 11 (Step S7).

When the click operation is detected by the click detection unit 32, the setting change processing unit 33 displays on the display device 12 the edit screen for changing the icon included in the icon menu (Step S8).

Figure 8:
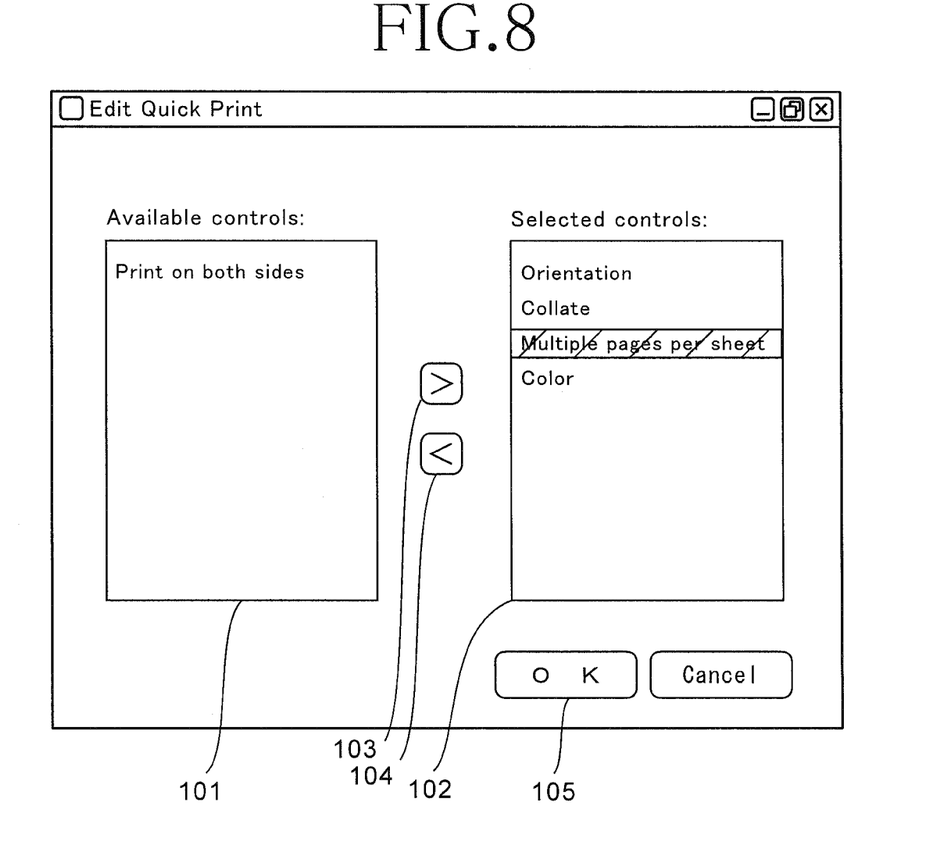
FIG. 8 is a diagram illustrating an example of an edit screen displayed in the first embodiment of the present invention.

FIG. 8 is a diagram illustrating an example of the edit screen displayed in this embodiment. Displayed in the edit screen are a list 101 of the setting items that can be selected and a list 102 of the setting items that have already been selected. At this time, the customization unit 35 reads the icon lists 22a and 22b to identify the selected setting items, and displays the list 102. Then, the customization unit 35 identifies the setting items obtained by excluding the setting items included in the list 102 from all of predetermined setting items, and displays the list 101.

Then, if one of the setting items in the list 101 is selected and if an addition button 103 is depressed, the customization unit 35 detects the operation performed on the input device 11, and adds the selected setting item to the list 102. The customization unit 35 deletes the setting item from the list 101, and further adds the setting item to the icon list 22b. In this embodiment, the Static element of the setting item is added as a child element of the Window element in the icon list 22b.

Meanwhile, if one of the setting items in the list 102 is selected and if a deletion button 104 is depressed, the customization unit 35 detects the operation performed on the input device 11, and deletes the selected setting item from the list 102. The customization unit 35 adds the setting item to the list 101, and further deletes the setting item from the icon list 22b. In this embodiment, the Static element of the setting item is deleted from the icon list 22b. Alternatively, the value of the ShowUI element within the Static element of the setting item is changed from "True" to "False".

Further, when an OK button 105 on the edit screen is depressed, the customization unit 35 brings the customization processing to an end. After that, the processing of Step S1 and the subsequent steps is executed again.

Figure 9:
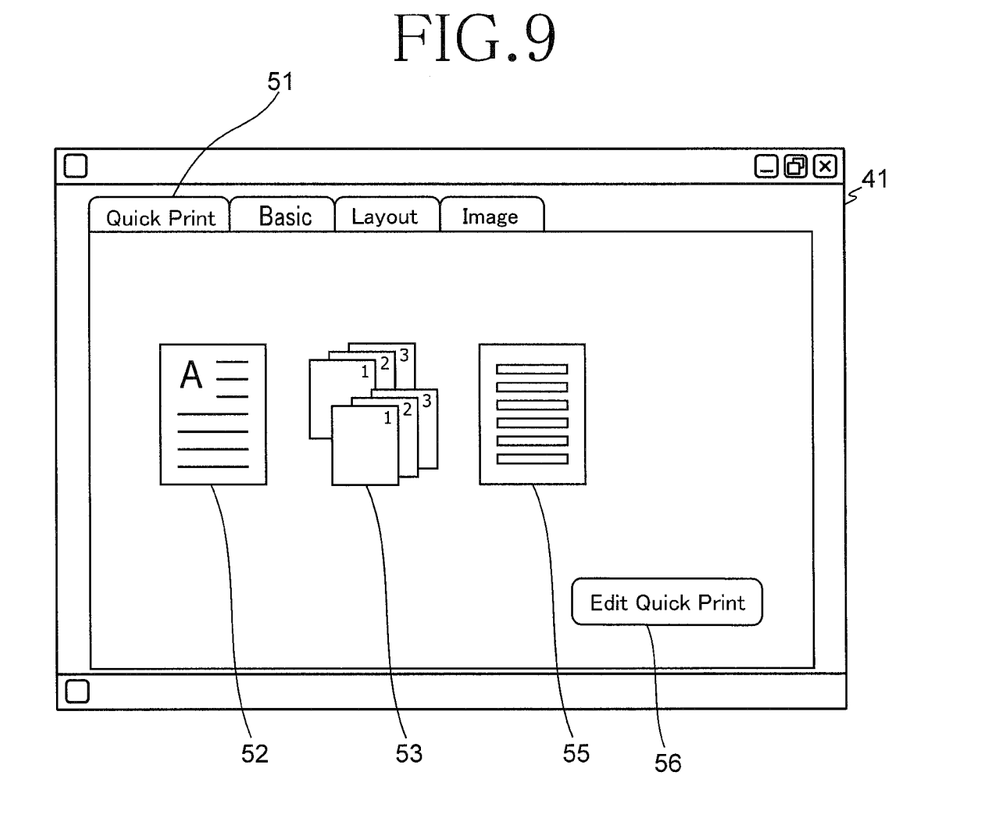
FIG. 9 is a diagram illustrating an example of the icon menu after customization in the first embodiment of the present invention.

For example, after the setting item "multiple pages grouping per paper" is deleted from the list 102 on the edit screen illustrated in FIG. 8, the icon menu illustrated in FIG. 4 is changed as illustrated in FIG. 9. FIG. 9 is a diagram illustrating an example of the icon menu after customization in this embodiment. If the setting item "multiple pages grouping per paper" is deleted, as illustrated in FIG. 9 the icon 54 corresponding to the setting item "multiple pages grouping per paper" is deleted from the icon menu. In this embodiment, if the setting item "multiple pages grouping per paper" is deleted, the icon list 22b illustrated in FIG. 2B is deleted, or the value of the ShowUI element within the Static element of the setting item "multiple pages grouping per paper" in the icon list 22b illustrated in FIG. 2B is alternatively changed from "True" to "False". Further, the values of the Dimension element within the Static element related to the succeeding icon 55 in the icon menu are changed. Therefore, as illustrated in FIG. 9, the icon 54 corresponding to the setting item "multiple pages grouping per paper" is deleted from the icon menu, and the icons 52, 53, and 55 within the icon menu are spaced at regular intervals as illustrated in FIG. 9. In addition, the order of the icons within the icon menu is set to the order of the setting items in the list 102 on the edit screen illustrated in FIG. 8. And, if the order of the setting items in the list 102 is changed, the values of the Dimension element are changed corresponding to the order.

As described above, according to the first embodiment of the present invention, the computer 15 executes the driver program 21 on the terminal apparatus 1 to implement the icon display processing unit 31, the click detection unit 32, the setting change processing unit 33, the control unit 34, and the customization unit 35. The icon display processing unit 31 displays on the display device 12 the icons associated with the setting items registered in the icon lists 22a and 22b. When the click operation is detected by the click detection unit 32, the setting change processing unit 33 changes the value of the setting item associated with the clicked icon to another value. Then, the icon display processing unit 31 switches the icon image of the icon displayed on the display device 12, corresponding to a change of the value of the setting item performed by the setting change processing unit 33. The icon display processing unit 31 switches from the icon image corresponding to the value of the setting item before the change to the icon image corresponding to the value of the setting item after the change. The customization unit 35 customizes the icon lists 22a and 22b by performing addition/deletion of the setting item to/from the icon lists 22a and 22b.

According to the first embodiment, the user can immediately confirm the value of the setting item associated with the icon. Then, the user can change the value of the setting item by a simple operation. Further, the user can easily change the setting item displayed as an icon. In addition, the customization unit 35 only displays the icons corresponding to the values of the setting items that are frequently changed by the user in the icon menu. Therefore, the user can immediately find the icon for which he or she wishes to change the value of the setting item, and change the value of the setting item.

Further, the value of the setting item associated with the icon is one of a plurality of predetermined values. Each time the click operation on the icon is detected, the setting change processing unit 33 changes the value of the setting item in a predetermined order. After reaching the last value of the setting item in the predetermined order, the setting change processing unit 33 changes the last value to the first value of the setting item in the predetermined order. This enables the user to keep switching the icon image by repeating the click operation without an end. Therefore, the icon image that has been displayed is displayed again by a repetition of the same click operation. The user can set the value of the setting item to a desired value by a simple operation.

Further, the icon display processing unit 31 displays on one screen of the display device 12 the icons 52 to 55 respectively associated with the setting items regarding the printing function. The click detection unit 32 detects the click operation performed on one of the icons 52 to 55. This enables the user to set the values of the setting items on the same screen collectively by a simple operation. In addition, only the icons corresponding to setting items that are frequently changed by the user are displayed in the icon menu by the customization unit 35. Hence, the user can set the values of the setting items that are frequently changed on the same screen collectively by a simple operation.

Further, the control unit 34 controls the image forming apparatus 2 based on the values of the setting items. Then, the icon display processing unit 31 displays the icons 52 to 55 associated with the setting items regarding the printing function of the image forming apparatus 2. This enables the user to set the values of the setting items for the image forming apparatus 2 collectively by a simple operation.

Further, each icon image is prepared corresponding to a plurality of values of one setting item. Then, each of the plurality of icon images is set as mutually different. This enables the user to immediately visually recognize the value of the setting item that is currently set by the icon image.

Second Embodiment

Figure 10:
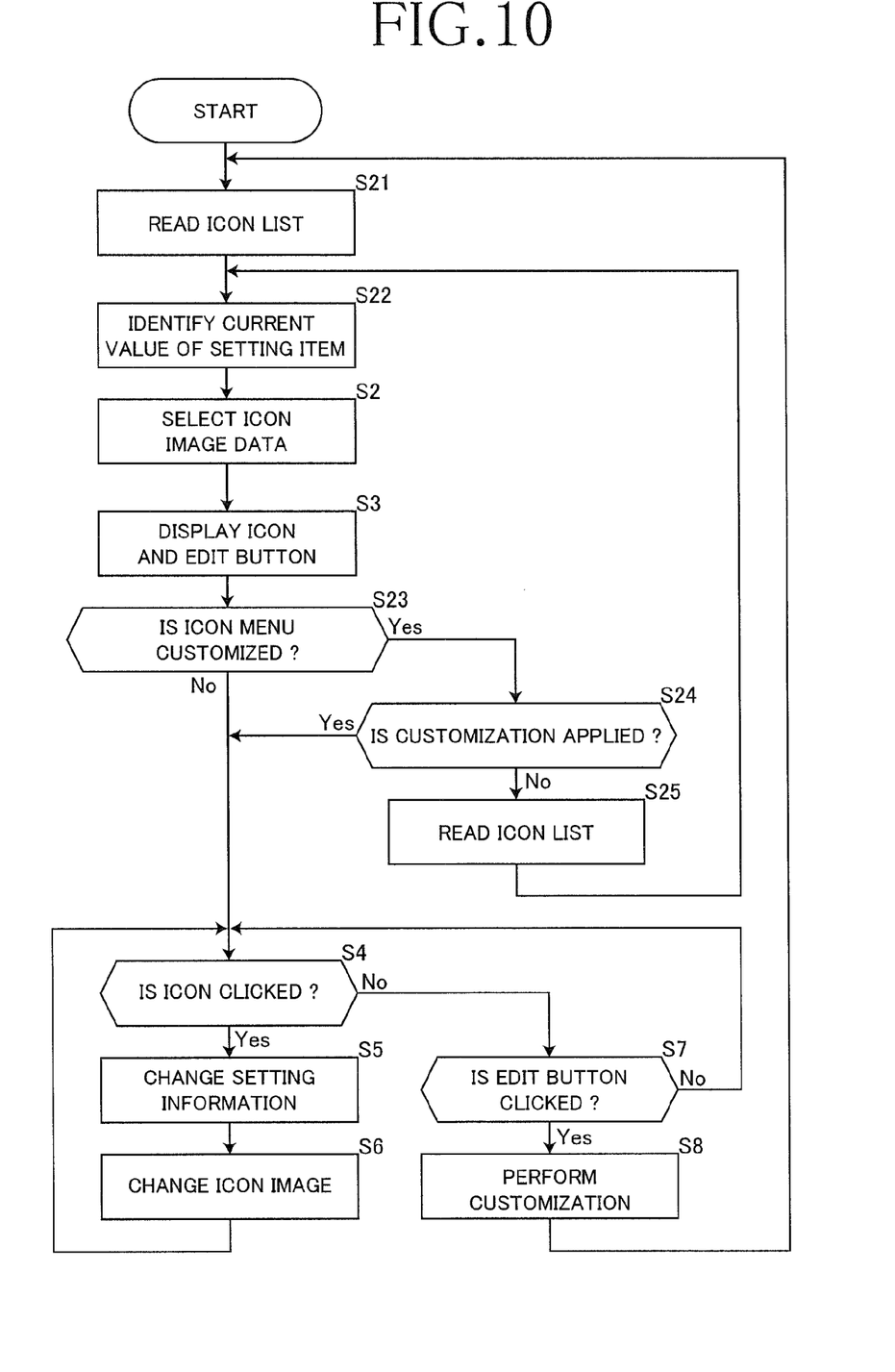
FIG. 10 is a flowchart for describing an operation of a terminal apparatus including a computer that executes a driver program stored in a recording medium according to a second embodiment of the present invention.

In a second embodiment, the icon menu is displayed in a process different from the first embodiment. FIG. 10 is a flowchart for describing an operation of a terminal apparatus 1 on which a driver program is installed according to the second embodiment of the present invention. It should be noted that the configuration of the terminal apparatus 1 of the second embodiment is the same as that of the first embodiment.

In this embodiment, when the initial screen of the icon menu is displayed, the icon display processing unit 31 reads the default icon list 22a to identify the setting items registered in the icon list 22a. And, the icon display processing unit 31 identifies the icons corresponding to the setting items as default icons to be included in the icon menu (Step S21).

The icon display processing unit 31 reads the setting information 22 (for example, DEVMODE) from the data storage device 14, and identifies the current values of the setting items (Step S22).

Then, the icon display processing unit 31 reads the icon image data 23 corresponding to the current values of the setting items from the data storage device 14 (Step S2). The icon display processing unit 31 displays on the display device 12 the edit button and the default icons corresponding to the current values of the setting items (Step S3).

After the default icons are displayed in the icon menu, the icon display processing unit 31 decides based on presence/absence of the icon list 22b whether the icon menu is customized or not (Step S23). If deciding that the icon menu is customized, the icon display processing unit 31 decides whether or not the customization has been applied to the icon list 22b yet (Step S24). If deciding that the customization has not been applied to the icon list 22b yet, the icon display processing unit 31 reads the icon list 22b (Step S25). Based on the icon list 22b, the icon display processing unit 31 again performs the Step S22 and the subsequent steps.

Meanwhile, if deciding in Step S23 that the icon menu is not customized, and if deciding in Step S24 that the customization has already been applied, the icon display processing unit 31 performs Step S4 and the subsequent steps. It should be noted that Step S4 and the subsequent steps is the same as the process of the first embodiment.

As described above, according to the second embodiment of the present invention, when customizing the icon menu based on the default icon list 22a, the customization unit 35 separately generates the icon list 22b after the customization without changing the default icon list 22a. And, the customization unit 35 stores the icon list 22b in the data storage device 14. The icon display processing unit 31 decides based on the presence/absence of the icon list 22b whether or not the icon menu based on the icon list 22a is customized. If the icon menu based on the icon list 22a is customized, the icon display processing unit 31 displays on the display device 12 the icons associated with the setting items registered in the icon list 22b after the customization.

Therefore, the default icon list is retained even after the customization of the icon display is performed. The user is able to return to the default icon menu from the customized icon menu with ease. For example, a default button may be provided to the edit screen illustrated in FIG. 8 and/or the icon menu illustrated in FIG. 9. And, if the default button is depressed, the customization unit 35 deletes the icon list 22b to display the default icon menu based on the default icon list 22a.

The present invention includes various other embodiments. For example, other designs can be used in which the above-described components are each performed.

In the first embodiment, after reaching the last value in the order of the values of the setting item, the value may be changed in an order inverse to the above-mentioned order from the last value to the first value.

Further, in the first embodiment, the number of icons in the icon menu illustrated in FIG. 4 is "4", but is not limited to "4". The number of icons may be one of "1" to "3" and "5" or greater. Further, the kinds of setting item are not limited to those illustrated in FIG. 4. Further, in the icon menu, the icon for the setting item that is operated less frequently may be automatically changed to the icon for the setting item that is operated more frequently.

Further, in the first embodiment, there are two or three values of the setting item, but there may be four or more values (that is, four or more kinds of icon image) of the setting item.

Further, in the first embodiment, if the value of the setting item is changed by clicking an icon, and the change of the value makes it impossible to select one of the values of the setting item associated with another icon, the one of the values may be removed from the order of the values of the setting item associated with another icon.

Further, in the first embodiment, the click operation is used as the operation for changing the value of the setting item, but the click operation may be a single click and a double click. In addition, various mouse gestures, various finger gestures, and the like may be used for the operation.

Further, in the second embodiment, the icon list 22b includes the setting items added by the customization of the icon menu. Further, the icon list 22b may include the setting item to be deleted from the default icon list 22a by the customization of the icon menu. In that case, the setting item to be deleted is not deleted from the icon list 22a, but the icon display processing unit 31 does not display the icon associated with the setting item to be deleted from the icon list 22a. Alternatively, the icon list 22b may include all of the setting items after the customization. In that case, if the icon list 22b exists, the icon display processing unit 31 displays on the display device 12 the icon associated with the setting item registered in the icon list 22b instead of the icon list 22a.

Further, in the second embodiment, the icon lists 22a and 22b may be provided as one list. In that case, the Window element including the Static element regarding all of the setting items available in the icon menu is described. Then, whether the icon associated with the setting items is to be displayed or not is decided based on the value of the ShowUI element within the Static element corresponding to the setting item. FIG. 11 is a diagram illustrating an example of the one icon list that combines the icon lists 22a and 22b. In the icon list illustrated in FIG. 11, the four setting items illustrated in FIGS. 2A and 2B can be used. However, of the four setting items, the icon associated with the setting item "multiple pages grouping per paper" is set to be hidden. The icon menu based on the icon list illustrated in FIG. 11 is displayed as illustrated in FIG. 9. Further, the default icon menu may be displayed by providing another list that specifies the setting items in the default icon menu, or may be displayed by describing a child element within the Static element that specifies whether the setting items in the default icon menu are to be displayed or not.

What is claimed is:

1. A non-transitory computer-readable recording medium storing a driver program, the driver program causing a computer to function as:
   an icon display processing unit configured to display on a display device an icon associated with a setting item registered in an icon list, wherein the icon list is described in Extensible Markup Language (XML);
   an operation detection unit configured to detect an operation performed on the icon;

a setting change processing unit configured to, in response to detecting the operation performed on the icon, change a value of the setting item associated with the icon upon which the operation has been performed, wherein the value of the setting item is changed according to a plurality of predetermined values having a predetermined order, and wherein after a last value of the plurality of predetermined values is reached in the predetermined order, the value is changed to a first value in the predetermined order of the plurality of predetermined values;

an icon image switch processing unit configured to, in response to detecting the operation performed on the icon, switch an icon image of the icon from an icon image corresponding to the value of the setting item before a change of the value of the setting item to an icon image corresponding to the value of the setting item after the change of the value of the setting item; and a customization unit configured to customize the icon list by performing at least one of adding or deleting the setting item to/from the icon list, wherein the icon display processing unit is further configured to i) identify an element described in the XML corresponding to the setting item in the icon list; ii) determine, based on a value of a child element described in the XML within the element, whether the icon associated with the setting item is displayed or not; and iii) identify a display position and a display size of the icon based on the value of the child element, and wherein the setting change processing unit and the icon image switch processing unit are further configured to change the value of the setting item and switch the icon image by a call-back function specified by the value of the child element when the operation performed on the icon is detected.

2. The non-transitory computer-readable recording medium according to claim 1, wherein:
the element comprises a Static element; and
the child element comprises a Procedure element.

3. The non-transitory computer-readable recording medium according to claim 1, wherein:
the element comprises a Static element;
the child element comprises a ShowUI element;
the icon is displayed if a value of the ShowUI element is "True"; and
the icon is not displayed if the value of the ShowUI element is "False".

4. The non-transitory computer-readable recording medium according to claim 1, wherein:
the element comprises a Static element; and
the child element comprises a Dimension element, wherein the Dimension element comprises:
an X element and a Y element that specify values of XY coordinates of the icon image; and
a width element and a height element that specify values of a width and a height of the icon image.

5. The non-transitory computer-readable recording medium according to claim 1, wherein the customization unit is further configured to display on the display device an edit screen for performing the at least one of adding or deleting the setting item to/from the icon list.

6. The non-transitory computer-readable recording medium according to claim 5, wherein the customization unit is further configured to display on the edit screen an unselected item list and a selected item list, the unselected item list indicating a list of setting items that can be selected, the selected item list indicating a list of setting items that have already been selected.

7. The non-transitory computer-readable recording medium according to claim 6, wherein when a setting item from the unselected item list is selected by a user, the customization unit is further configured to move the selected setting item from the unselected item list to the selected item list.

8. The non-transitory computer-readable recording medium according to claim 7, wherein:
the selected item list and the unselected item list comprise text data described in XML;
the icon display processing unit is further configured to identify elements corresponding to setting items in the selected item list and the unselected item list;
the setting change processing unit and the icon image switch processing unit are further configured to change the values of setting items and switch the icon images by at least one function specified by values of child elements within the elements; and
when a setting item from the unselected item list is selected by a user, a Static element of the selected setting item from the unselected item list is added as the child element within the element of the setting item in the selected item list.

9. The non-transitory computer-readable recording medium according to claim 1, wherein the customization unit is further configured to generate a second list after customization based on a default list and store the second list in a storage device without changing the default list.

10. The non-transitory computer-readable recording medium according to claim 9, wherein the icon display processing unit is further configured to determine whether the second list exists or not, and if the second list exists, display on the display device an icon associated with a setting item registered in the second list.

11. The non-transitory computer-readable recording medium according to claim 1, wherein the icon display processing unit is further configured to display an icon associated with a setting item associated with a printing function.

12. An image forming system comprising:
an image forming apparatus connected to a communication path;
a terminal apparatus connected to the communication path and generating image output data and transmitting the image output data to the image forming apparatus;
the terminal apparatus comprising:
a display device;
a data storage device configured to store a driver program; and
a computer configured to control the image forming apparatus;
the driver program causing the computer to function as:
an icon display processing unit configured to display on the display device an icon associated with a setting item registered in an icon list, wherein the icon list is described in Extensible Markup Language (XML), and wherein the setting item is associated with a printing function;
an operation detection unit configured to detect an operation performed on the icon;
a setting change processing unit configured to, in response to detecting the operation performed on the icon, change the value of the setting item associated with the icon upon which the operation has been performed, wherein the value of the setting item is changed according to a plurality of predetermined values having a predetermined order, and wherein after a last value of the plurality of predetermined values is reached in the predetermined order, the value is changed to a first value in the predetermined order of the plurality of predetermined values;

an icon image switch processing unit configured to, in response to detecting the operation performed on the icon, switch an icon image of the icon from an icon image corresponding to the value of the setting item before a the change of the value of the setting item to an icon image corresponding to the value of the setting item after the change of the value of the setting item; and a customization unit configured to customize the icon list by performing at least one of adding or deleting the setting item to/from the icon list, wherein the icon display processing unit is further configured to i) identify an element described in the XML corresponding to the setting item in the icon list; ii) determine, based on a value of a child element described in the XML within the element, whether the icon associated with the setting item is displayed or not; and iii) identify a display position and a display size of the icon based on the value of the child element, and wherein the setting change processing unit and the icon image switch processing unit are further configured to change the value of the setting item and switch the icon image by a call-back function specified by the value of the child element when the operation performed on the icon is detected.

13. An image forming apparatus connected to a terminal apparatus via a communication path;

the terminal apparatus generating image output data and transmitting the image output data to the image forming apparatus, the terminal apparatus comprising a display device, a data storage device configured to store a driver program, and a computer;

the driver program causing the computer to function as:

an icon display processing unit configured to display on the display device an icon associated with a setting item registered in an icon list, wherein the icon list is described in Extensible Markup Language (XML), and wherein the setting item is associated with a printing function and is used by the computer to control the image forming apparatus;

an operation detection unit configured to detect an operation performed on the icon;

a setting change processing unit configured to, in response to detecting the operation performed on the icon, change a value of the setting item associated with the icon upon which the operation has been performed, wherein the value of the setting item is changed according to a plurality of predetermined values having a predetermined order, and wherein after a last value of the plurality of predetermined values is reached in the predetermined order, the value is changed to a first value in the predetermined order of the plurality of predetermined values;

an icon image switch processing unit configured to, in response to detecting the operation performed on the icon, switch an icon image of the icon from an icon image corresponding to the value of the setting item before a change of the value of the setting item to an icon image corresponding to the value of the setting item after the change of the value of the setting item; and a customization unit configured to customize the icon list by performing at least one of adding or deleting the setting item to/from the list, wherein the icon display processing unit is further configured to i) identify an element described in the XML corresponding to the setting item in the icon list; ii) determine, based on a value of a child element described in the XML within the element, whether the icon associated with the setting item is displayed or not; and iii) identify a display position and a display size of the icon based on the value of the child element, and wherein the setting change processing unit and the icon image switch processing unit are further configured to change the value of the setting item and switch the icon image by a call-back function specified by the value of the child element when the operation performed on the icon is detected.

14. A method for controlling an image forming apparatus, comprising:

displaying on a display device an icon associated with a setting item registered in an icon list, wherein the icon list is described in Extensible Markup Language (XML), and wherein the display device is part of a terminal apparatus connected to the image forming apparatus by a communication path, the terminal apparatus additionally comprising a computer and a data storage device;

identifying an element described in the XML corresponding to the setting item in the icon list;

detecting an operation performed on the icon;

changing a value of the setting item associated with the icon upon which the operation has been performed, wherein the value of the setting item is changed according to a plurality of predetermined values having a predetermined order by a call-back function specified by the value of a child element described in the XML within the element when the operation performed on the icon is detected, and wherein after a last value of the plurality of predetermined values is reached in the predetermined order, the value is changed to a first value in the predetermined order of the plurality of predetermined values;

switching an icon image of the icon from an icon image corresponding to the value of the setting item before a the change of the value of the setting item to an icon image corresponding to the value of the setting item after the change, of the value of the setting item by the call-back function specified by the value of the child element when the operation performed on the icon is detected;

determining, based on the value of the child element, whether the icon associated with the setting item is displayed or not;

identifying a display position and a display size of the icon based on the value of the child element; and customizing the icon list by performing at least one of adding or deleting the setting item to/from the icon list, wherein the setting item is associated with a printing function for controlling the image forming apparatus.

15. A driver program stored on the data storage device and operable to cause the computer to perform the method of claim 14.

* * * * *